(12) United States Patent
Guerrero

(10) Patent No.: US 7,180,894 B2
(45) Date of Patent: Feb. 20, 2007

(54) LOAD BALANCING ENGINE

(75) Inventor: Miguel A. Guerrero, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 1108 days.

(21) Appl. No.: 10/157,531

(22) Filed: May 29, 2002

(65) Prior Publication Data

US 2003/0223413 A1    Dec. 4, 2003

(51) Int. Cl.
*H04L 12/56* (2006.01)
(52) U.S. Cl. .................................................. 370/392
(58) Field of Classification Search ..................... None
See application file for complete search history.

(56) References Cited

U.S. PATENT DOCUMENTS

| | | | | |
|---|---|---|---|---|
| 5,506,841 | A * | 4/1996 | Sandquist | 370/355 |
| 6,208,644 | B1 * | 3/2001 | Pannell et al. | 370/389 |
| 6,587,431 | B1 * | 7/2003 | Almulhem et al. | 370/229 |
| 6,807,179 | B1 * | 10/2004 | Kanuri et al. | 370/395.31 |
| 7,003,574 | B1 * | 2/2006 | Bahl | 709/228 |

* cited by examiner

*Primary Examiner*—Chi Pham
*Assistant Examiner*—Anh-Vu Ly
(74) *Attorney, Agent, or Firm*—Buckley, Maschoff & Talwalkar LLC

(57) ABSTRACT

According to some embodiments, a packet of information may be received, and one of K slots for the packet may be selected based on $K*R/2^r$, R being a vector based on the packet and having r bits. The packet may then be transmitted to a remote device via an output port associated with the selected slot.

18 Claims, 5 Drawing Sheets

GENERATE A VECTOR R
BASED ON A PACKET OF
INFORMATION, R HAVING r BITS
202

SELECT A SLOT BASED ON
$K*R/2^r$
204

LOAD BALANCING ENGINE

BACKGROUND

A network device can be used to facilitate a flow of information through a network. For example, a network device may receive a packet of information (e.g., from another network device or from the packet's original source) and select one of a number of output ports through which the packet will be transmitted (e.g., to another network device or to the packet's ultimate destination). One goal of the network device may be to balance the load between these output ports. That is, the network device may attempt to avoid routing significantly more packets through a first port as compared to a second port (e.g., to prevent unnecessary congestion at the first port).

To achieve such a result, the network device could simply assign a packet to an output port in a "round-robin" fashion (e.g., a first packet would be assigned to a first post and a second packet would be assigned to a second post). With this approach, however, two different packets can be assigned to two different ports even both of the packets are associated with a single stream of information (e.g., a stream of associated packets traveling from the same source address to the same destination address). This can be undesirable because different packets in the same stream might experience different delays (e.g., a second packet could arrive at a destination address before a first packet), which can degrade the performance of the network.

Another approach is to apply a hash function to a portion of the packet (e.g., to the source and destination addresses) resulting in a vector R having r bits. One of K output ports associated with a network device (i.e., ports numbered $0$ through $K-1$) are then selected using R modulo K (i.e., the remainder of R/K). For example, a network device with 12 output ports might apply a hash function and generate a six-bit R having a value of 43 for a particular packet of information. In this case, R modulo K (i.e., the remainder of 43/12) is 7, and output port number 7 is selected for that particular packet.

This approach, however, also has a number of disadvantages. For example, the logic circuits need to perform the division (e.g., dividing by 12 and determining the remainder) can occupy a relatively large area in the processing hardware, and the function can consume a significant amount of time, especially in a high speed network.

Moreover, the approach will result in a load balancing error. Consider, for example, a network device with 12 output ports that applies a hash function to generate a five-bit R (i.e., having a value between 0 and 31). In this case, assuming a randomly distributed R, the network device will be more likely to select some ports as compared to others. In particular, ports 0 through 8 can each be selected by three unique R values (e.g., port 2 will be selected if R equals 2, 14, or 26) while ports 9 through 11 can only be selected by two unique R values (e.g., port 10 will only be selected if R equals 10 or 22). In general, the percent of load balancing error will be $100/(2^r \text{ div } K)$, where "div" represents an integer division operation.

DETAILED DESCRIPTION

Some embodiments described herein are associated with a "network device." As used herein, the phrase "network device" may refer to any device adapted to facilitate a flow of information through a network.

A network device may comprise, for example, a network switch that selects a path through which information will be sent. As another example, a network device may comprise a network router that determines the next network point to which information will be sent. Note that a network device could be implemented via hardware and/or software and that the phrase can also refer to a portion of a network device (e.g., a portion of a network switch). For example, some or all of a network device might be implemented via a communication Application-Specific Integrated Circuit (ASIC). Moreover, a network device may comprise an Open Systems Interconnection (OSI) data link layer 2 device.

In addition, as used herein, the term "network" may refer to any set of interconnected communication paths. By way of example, a network may be a Fast Ethernet Local Area Network (LAN) as defined in transmission standard 802.3-2002 published by the Institute of Electrical and Electronics Engineers (IEEE). A network may also be associated with a Wide Area Network (WAN), an Internet Protocol (IP) network, an optical network, and/or a wireless network.

Network Device

Figure 1:
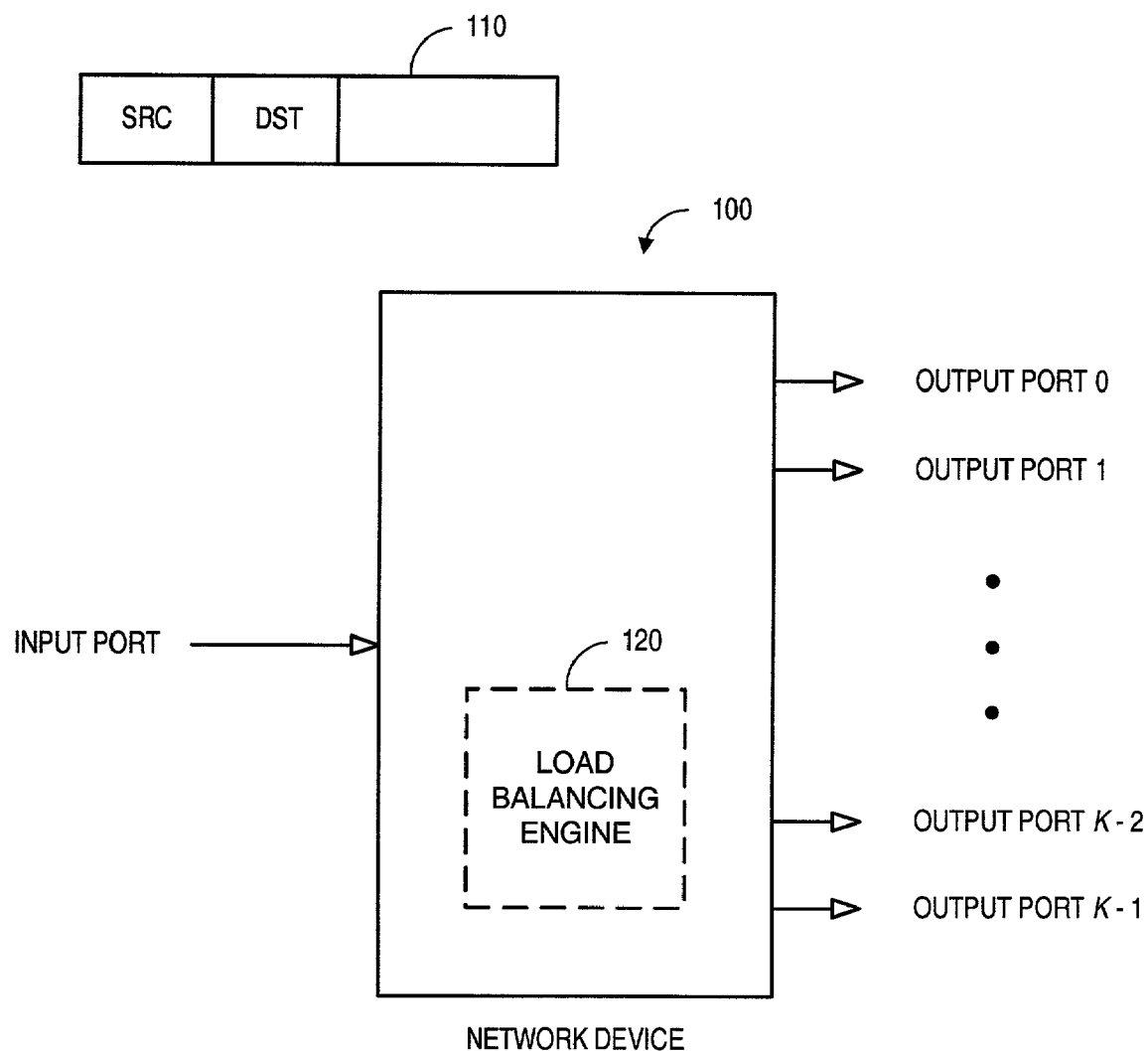
FIG. 1 is a block diagram of a network device according to some embodiments.

Turning now in detail to the drawings, FIG. 1 is a block diagram of a network device 100 according to some embodiments. The network device 100 includes an input port that may be used to receive a packet of information 110 (e.g., from another network device or from the packet's original source). The packet 110 may represent a portion of a stream of information being sent from a source to a destination and may include, for example, an indication of a Medial Access Control (MAC) source address ("SRC") and a destination address ("DST"). Note that the network device 100 might, according to some embodiments, include more than one input port.

The network device 100 also includes a number (K) of "slots" (e.g., output ports) that may be used to provide the packet 110 (e.g., to another network device or to the packet's ultimate destination). As used herein, k represents the number of bits required to represent the number K. For example, if a network device 100 has 12 slots, k=4 because four bits are required to represent 12 (i.e., "1100").

To facilitate the flow of information, the network device 100 also includes a load balancing engine 120 that selects which of the K slots will be used to provide a particular packet of information 110. According to some embodiments, the load balancing engine 120 is adapted to select a slot for a packet 110 based on $K*R/2^r$, where R is a vector that is associated with the packet 110 and that has r bits.

Slot Selection Method

Figure 2:
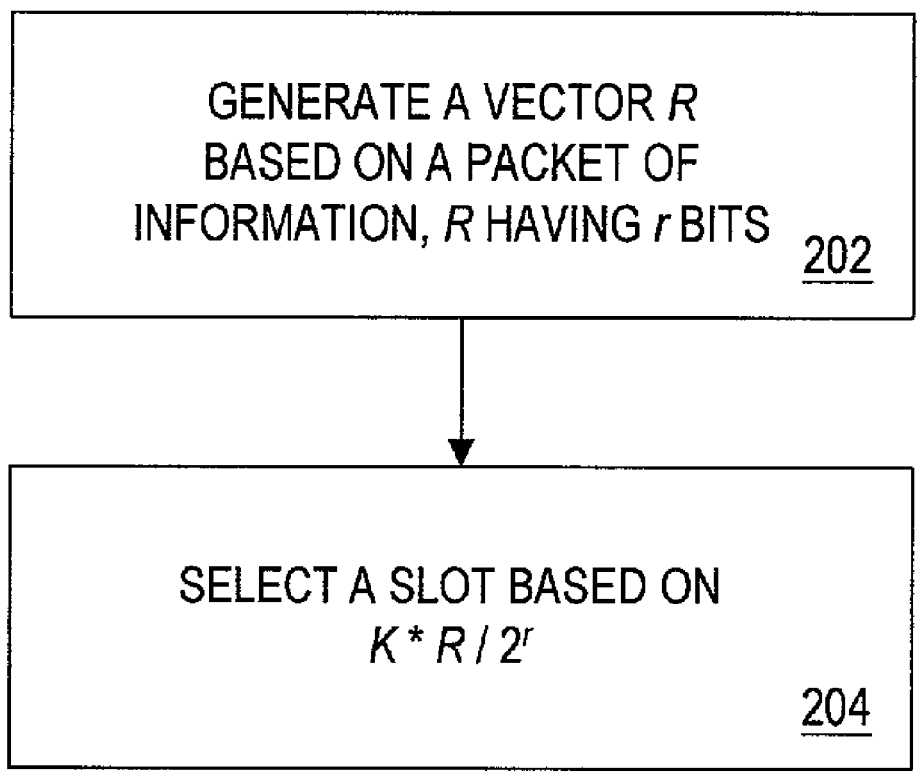
FIG. 2 is a block diagram of a method to select one of K slots for a packet of information according to some embodiments.

FIG. 2 is a block diagram of a method to select one of K slots for a packet of information according to some embodiments. The method may be performed, for example, by the load balancing engine 120 described with respect to FIG. 1. The flow charts in FIG. 2 and the other figures described herein do not imply a fixed order to the steps, and embodiments can be practiced in any order that is practicable.

At 202, a vector R is generated based on the packet of information (and R is comprised of r bits). For example, a hash function might be applied to source and destination addresses included in the packet resulting in the generation of R. Note that the hash function could also be applied to other information included in, or otherwise associated with, the packet.

The hash function might comprise, for example, one or more exclusive OR (XOR) operations. According to some embodiments, the hash function is "deterministic." That is, the hash function will always generate the same R when applied to the same original information (e.g., source and destination addresses). As will be explained, such a feature may enable the selection of the same slot for packets of information associated with the same stream of information. Moreover, the hash function may be designed such that R will be a uniformly distributed random series of r bits when the original information is a uniformly distributed random series. This feature may reduce any slot selection imbalance caused by the hash function itself. A hash function is described in, for example, Internet Engineering Task Force (IETF) Request For Comment (RFC) 2992, "Analysis of an Equal-Cost Multi-Path Algorithm" (2000).

At 204, a slot is selected for the packet of information based on $K*R/2^r$. Note that dividing $K*R$ by $2^r$ can be performed simply by extracting all but the r Least Significant Bits (LSBs) from the result of $K*R$. That is, any remainder associated with $K*R/2^r$ may be ignored.

Figure 3:
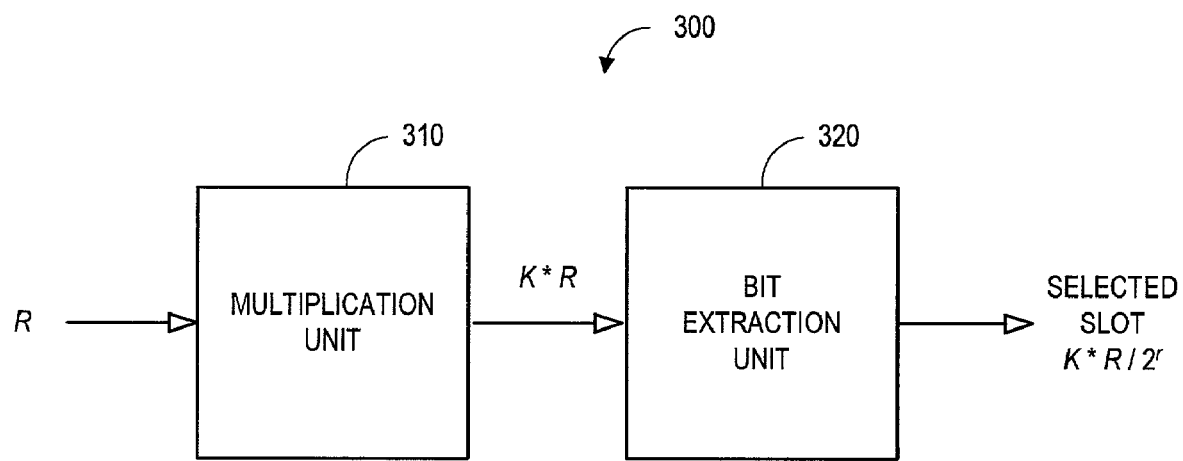
FIG. 3 is block diagram of a load balancing engine according to some embodiments.

Consider FIG. 3, which is block diagram of a load balancing engine 300 according to some embodiments. The load balancing engine 300 receives R at a multiplication unit 310 which generates $K*R$. This value is provided to a bit extraction unit 320 which extracts all but the r LSBs to generate a value based on $K*R/2^r$ (i.e., the selected slot). Note that the result of $K*R$ will have a total size of k+r bits. As a result, extracting "all but the r LSBs" is exactly the same as extracting the k MSBs.

By way of example, consider a network device that has 12 slots (i.e., K=12). Moreover, a hash function is applied to a portion of every received packet of information to generate a six-bit R. That is, r=6 and R could have any value from 0 ("000000") through 63 (i.e., "111111" or $2^r-1$). Now assume that the network device receives a particular packet of information, applies the hash function to a portion of the packet, and generates an R of 37 ("100101"). This value is provided to the load balancing engine 300, which in turn outputs $K*R/2^r$, selecting slot 6 (i.e., $12*37/2^6$, with the remainder being ignored).

Note that when a deterministic hash function is used to generate R, the same slot will be select for all packets of information that share the same source and destination addresses (i.e., because the values of K and r do not change).

Moreover, note that by definition:

$$0 \leq R \leq 2^r$$

And, as a result:

$$0 \leq K*R < K*2^r$$

and further:

$$0 \leq K*R/2^r < K$$

That is, the value is $K*R/2^r$ will always be less than K (and therefore, ignoring any remainder, can be used to represent a selected slot between 0 and K−1).

EXAMPLES

Figure 4:
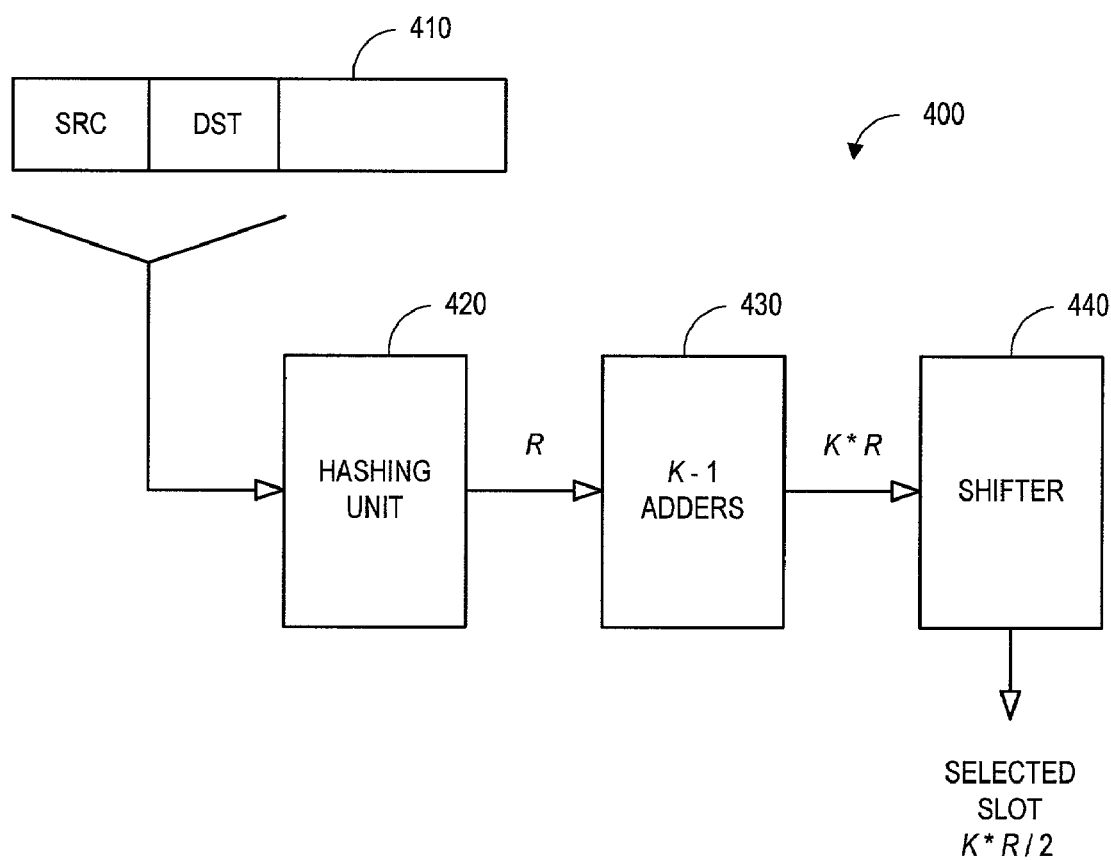
FIG. 4 is block diagram of a load balancing engine according to some embodiments.

FIG. 4 is block diagram of a load balancing engine 400 according to some embodiments. In this case, the load balancing engine 400 receives a portion of a packet of information 410 (i.e., the source address and the destination address), which will be referred to herein as vector M having m bits. A hashing unit 420 applies a hash function to M to calculate R. Note that typically r will be less than m (i.e., the hash function will reduce M) and that the hash function will deterministically map M into R. As a result, two packets of information with different source and destination addresses could result in the calculation of the same R (i.e., the same slot could be selected for both packets).

Moreover, the hash function may be designed such that R will be a uniformly distributed random series of r bits when M is a uniformly distributed random series of m bits (i.e., reducing any slot selection imbalance caused by the hash function itself).

The output of the hashing unit 420 (i.e., R) is provided to a multiplication unit comprised of K−1 adders 430. That is, a first adder may add R to itself to generate a result. A second adder may then add R to that result. When the process has been repeated K−1 times, the final result will represent $K*R$. Note that the result may have a size of k+r bits.

The output of the K−1 adders 430 (i.e., $K*R$) is provided to a shifter 440 that shifts the value right a total of r bit positions (discarding the bits that are shifted out). The output of the shifter 440 is therefore based on $K*R/2^r$ (i.e., representing a selected slot between 0 and K−1).

Figure 5:
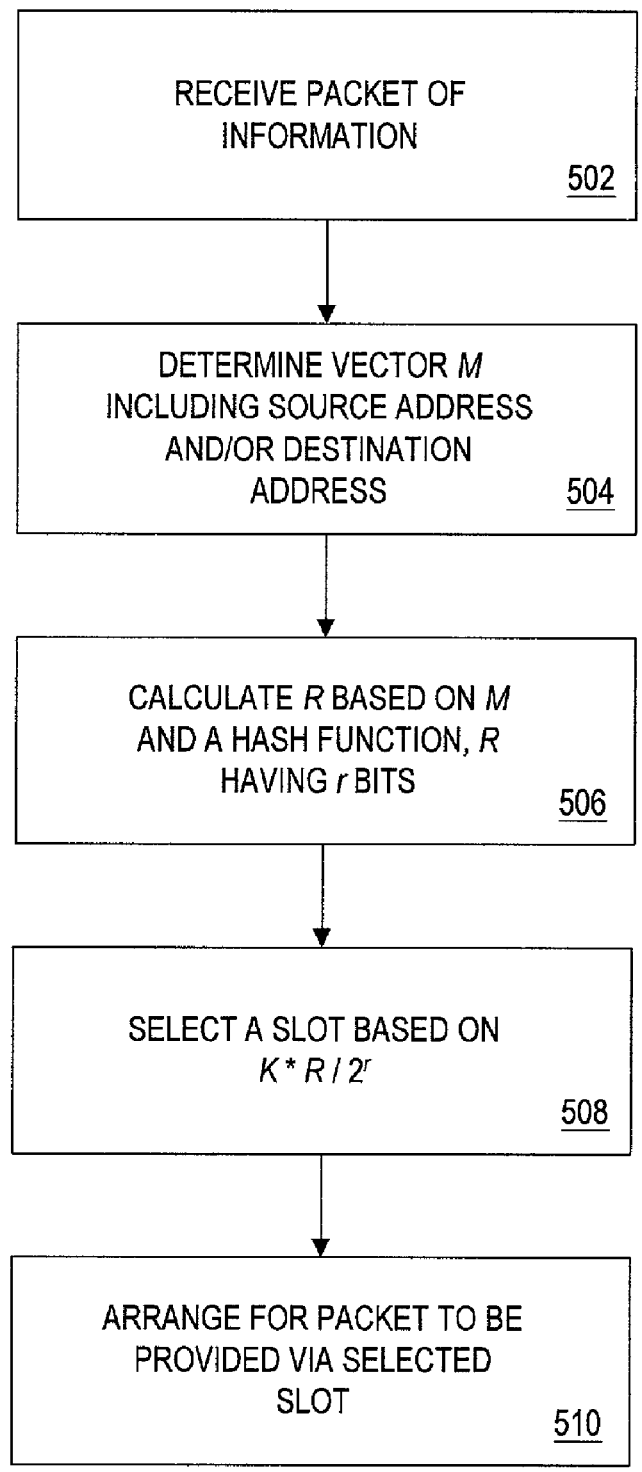
FIG. 5 is a block diagram of a method to select one of K slots for a packet of information according to some embodiments.

FIG. 5 is a block diagram of a method to select one of K slots for a packet of information according to some embodiments. Some or all of the method may be performed, for example, by any of the load balancing engines 120, 300, 400 described with respect to FIGS. 1, 3 and 4, respectively.

At 502, a packet of information is received (e.g., through an input port). A vector M including at least one of a source address and a destination address associated with the packet is determined at 504, wherein M has m bits.

At 506, R is calculated based on M and a hash function, R having r bits and wherein r<m. Moreover, the hash function deterministically maps M into R− and R will be a uniformly distributed random series of bits when M is a uniformly distributed random series of bits.

At 508, a slot is selected based on $K*R/2^r$. By way of example, the following function F may be used:

```
Function F(K, M) returns BitVector (k − 1, 0)
    Input BitVector (k − 1, 0) K;
    Input BitVector (m−1, 0) M;
    BitVector (r − 1, 0) R;
    BitVector (k + r − 1, 0); T
    R = H(M);        // H is a hash function
    T = K * R;       // this is equivalent to k − 1 adders
    return T[K + r − 1 : r];
endfunction
```

It is then arranged at 510 for the packet of information to be provided via the selected slot (e.g., the packet will be transmitted through an output port associated with that slot).

Thus, an efficient load balancing engine may be provided. For example, when k−1 adders and a shifter are used, the engine may occupy a relatively small area in the processing hardware (e.g., as compared to the dividing logic required by the R modulo K approach). Moreover, the adders and shifter may select slots in a relatively fast manner.

Note that embodiments described herein may result in some load balancing error. In general, the percent of load balancing error will be $100/2^r$. Note that this error decreases exponentially with the size of R. For example, when r is 7 bits the error is less than 1%, and when r is 10 bits the error is less than 0.1% (which will typically compare favorably with the error associated with the R modulo K approach).

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although some embodiments have been described with respect to selecting from all of a network device's output ports, note that a selection may instead be from a subset of the output ports (e.g., a load balancing engine may select one of ports 2 through 12). Moreover, the subset may be selectable by a user. In addition, the selection may be associated with a packet prioritization scheme and/or a packet weight, such as an Equal Cost Multi-Path (ECMP) routing algorithm as described in IETF RFC 2992, "Analysis of an Equal-Cost Multi-Path Algorithm" (2000).

Moreover, although software or hardware are described to control certain functions, such functions may be performed using either software, hardware or a combination of software and hardware (e.g., a medium may store instructions adapted to be executed by a processor to perform a method to select one of K slots for a packet of information).

The several embodiments described herein are solely for the purpose of illustration. Persons skilled in the art will recognize from this description other embodiments may be practiced with modifications and alterations limited only by the claims.

What is claimed is:

1. A method to select one of K slots for a packet of information, comprising:
   receiving the packet;
   generating a vector R based on the packet, R having r bits;
   selecting a slot based on $K*R/2^r$; and
   transmitting the packet to a remote device via an output port associated with the selected slot.

2. The method of claim 1, wherein said generating comprises:
   determining a vector M associated with the packet; and
   calculating R based on M and a hash function.

3. The method of claim 2, wherein M is based on at least one of a source address and a destination address associated with the packet.

4. The method of claim 2, wherein M has m bits and r<m.

5. The method of claim 2, wherein the hash function deterministically maps M into R.

6. The method of claim 2, wherein R comprises a uniformly distributed random series of r bits when M comprises a uniformly distributed random series of m bits.

7. The method of claim 1, wherein said selecting comprises:
   multiplying K and R via K−1 adders to obtain a result; and
   extracting all but the r least significant bits from the result.

8. The method of claim 7, wherein said extracting comprises:
   shifting the result to the right by r bit positions.

9. The method of claim 1, wherein the K slots are associated with at least one of: (i) a network device, (ii) a network switch, (iii) a network router, and (iv) a load balancing engine.

10. The method of claim 9, wherein the packet is associated with an Ethernet network.

11. A computer-readable medium storing instructions to be executed by a processor to perform a method to select one of K slots for a packet of information, said method comprising:
    generating a vector R based on the packet, R having r bits;
    selecting a slot based on $K*R/2^r$; and
    transmitting the packet to a remote device via an output port associated with the selected slot.

12. The computer-readable medium of claim 11, wherein said generating comprises:
    determining a vector M based on the packet; and
    calculating R based on M and a hash function.

13. A load balancing engine to select one of K slots for a packet of information, comprising:
    a multiplication unit to generate a result representing $K*R$, R being a vector based on the packet and having r bits;
    a bit extraction unit coupled to said multiplication unit to extract all but the r least significant bits from the result; and
    K output ports to transmit packets of information via a communication network based, at least in part, on information from the bit extraction unit.

14. The load balancing engine of claim 13, further comprising:
    a hashing unit coupled to said multiplication unit to provide R based on a vector M associated with the packet and a hash function.

15. A network device, comprising:
    an input port;
    K output ports to transmit packets to remote devices via a communication network; and
    a load balancing engine to select one of the K output ports for a packet of information received via the input port based on $K*R/2^r$, R being a vector based on the packet and having r bits.

16. The network device of claim 15, wherein the load balancing engine is further adapted to calculate R based on M and a hash function, M being a vector associated with the packet.

17. A method to select one of K slots, comprising:
    receiving a packet of information;
    determining a vector M including at least one of a source address and a destination address associated with the packet, wherein M has m bits;
    calculating R based on M and a hash function, R having r bits and r<m, wherein (i) the hash function deterministically maps M into R and (ii) R comprises a uniformly distributed random series of r bits when M comprises a uniformly distributed random series of m bits;
    selecting a slot based on $K*R/2^r$; and
    transmitting the packet via the selected slot to a remote device.

18. The method of claim 17, wherein the K slots are associated with at least one of: (i) a network device, (ii) a network switch, (iii) a network router, (iv) an Ethernet network, and (v) a load balancing engine.

* * * * *